United States Patent
Nigro et al.

(10) Patent No.: US 10,848,447 B2
(45) Date of Patent: Nov. 24, 2020

(54) MANAGING GRAPHIC AND/OR AUDIO ELEMENTS IN A MESSAGING SYSTEM

(71) Applicant: Social Media Emotions S.r.l., Vicenza (IT)

(72) Inventors: Filippo Nigro, Vicenza (IT); Nicola Dal Bosco, Vicenza (IT)

(*) Notice: Subject to any disclaimer, the term of this patent is extended or adjusted under 35 U.S.C. 154(b) by 0 days.

(21) Appl. No.: 16/628,009

(22) PCT Filed: Jul. 13, 2018

(86) PCT No.: PCT/IB2018/055193
§ 371 (c)(1),
(2) Date: Dec. 31, 2019

(87) PCT Pub. No.: WO2019/012493
PCT Pub. Date: Jan. 17, 2019

(65) Prior Publication Data
US 2020/0228479 A1    Jul. 16, 2020

(30) Foreign Application Priority Data
Jul. 14, 2017    (IT) .................. 102017000080016

(51) Int. Cl.
*G06F 15/173* (2006.01)
*H04L 12/58* (2006.01)

(52) U.S. Cl.
CPC ............ *H04L 51/10* (2013.01); *H04L 51/046* (2013.01); *H04L 51/063* (2013.01)

(58) Field of Classification Search
CPC ...... H04L 51/10; H04L 51/046; H04L 51/063
See application file for complete search history.

(56) References Cited

U.S. PATENT DOCUMENTS

| | | | |
|---|---|---|---|
| 8,775,341 B1* | 7/2014 | Commons | G10L 15/16 706/20 |
| 9,699,299 B1 | 7/2017 | Pereira | |
| 2013/0090961 A1* | 4/2013 | Smith | G06Q 40/00 705/7.11 |

(Continued)

FOREIGN PATENT DOCUMENTS

| | | |
|---|---|---|
| WO | 2014100682 | 6/2014 |
| WO | 2015122993 | 8/2015 |
| WO | 2017059524 | 4/2017 |

*Primary Examiner* — Thanh T Nguyen
(74) *Attorney, Agent, or Firm* — Themis Law

(57) ABSTRACT

A messaging includes a sender and a receiver of text messages via a central unit that includes a database, in which a user dataset containing a univocal identification code for each user relates with an element dataset containing univocal identification codes of all graphic and/or audio elements manageable by the messaging system, thereby defining the graphic and/or audio elements accessed or managed by each user. Each graphic and/or audio element is manageable by association with the univocal identification code. A first software module in the sender or receiver sends a data structure to the central unit based on a graphic and/or audio element and has a first field containing a univocal identification code, and a second software module in the central unit creates a structured data package based on the received data structure having a second field filled at least partly with the first field of the data structure.

20 Claims, 7 Drawing Sheets

(56) References Cited

U.S. PATENT DOCUMENTS

Figure 1:
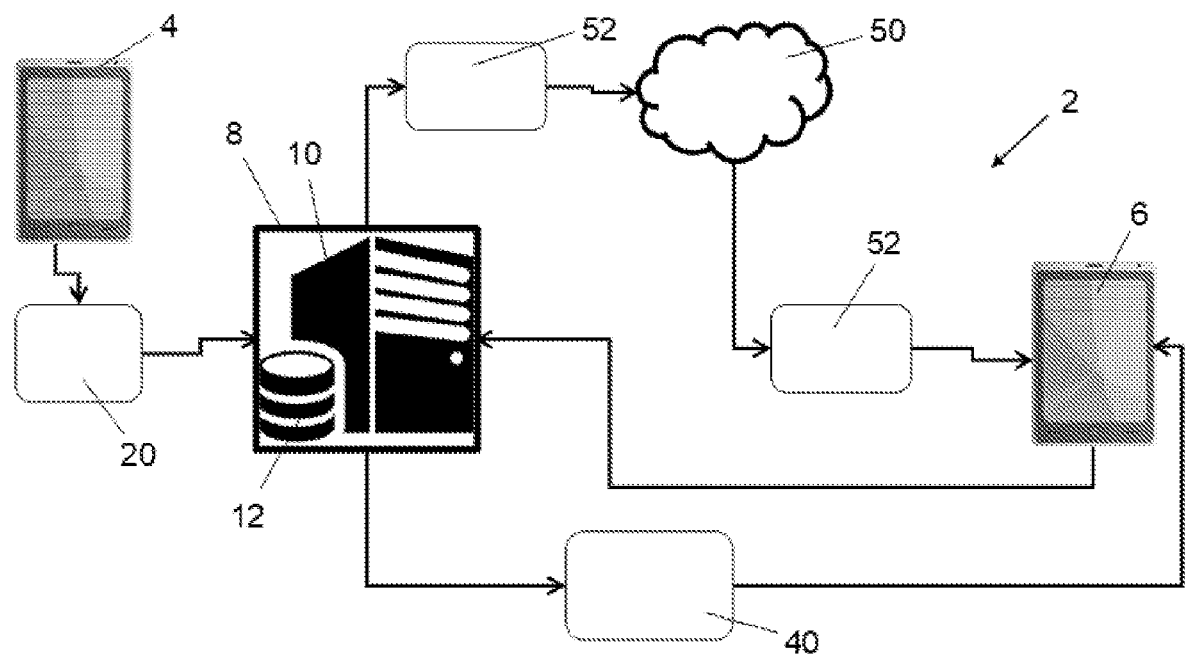

2015/0327033 A1 11/2015 Kalman
2018/0240138 A1* 8/2018 Le .................... G06Q 30/0203
2020/0175038 A1* 6/2020 Guan ................. G06F 16/2282

* cited by examiner

MANAGING GRAPHIC AND/OR AUDIO ELEMENTS IN A MESSAGING SYSTEM

The present invention relates to an improved messaging system, preferably instantaneous, and to an improved method for managing graphic and/or audio elements in a messaging system.

Currently, emoticons, which involve the use of particular combinations of characters (letters, numbers, punctuation, etc.) in the text of the message itself in order to create symbolic graphics to express a particular mood, are already widely used in messaging systems, in particular of the instantaneous type.

So-called emojis are also already known, which instead are real images associated with and connected to a given coding, generally of the Unicode type. For this purpose, emojis must be supported by appropriate software able to read it, otherwise they cannot be shown.

In this context, when exchanging messages containing emojis, it may occur that the same coding is associated with different images between sender and receiver, thus causing undesirable misunderstandings. Not only, it sometimes occurs that a given emoji is not supported on the receiver's terminal or there is no image associated with the encoding used by the sender, thus causing the display of an unpleasant space or white square.

WO2017/059524 describes a messaging system in which all users can use all the graphic elements (such as the emojis, stickers, memes) loaded into the system and, in particular, there is no prior architecture and authorization/enabling mechanism (or for monitoring such authorization/enabling) is provided for using or inserting the graphic elements in a message to be sent. In particular, in order to facilitate the viral diffusion of the graphic elements used in such system, when a message with a graphic element is received by the corresponding device of the receiver and, possibly downloaded from the centralized library, such element can then be freely inserted by the receiver in a new message to be sent as sender.

WO2014/100682 describes a messaging system in which, when a message with a graphic and/or audio element—which is not already present in the local library of receiver device—is received by the corresponding device of the receiver, such graphic and/or audio element is downloaded from the centralized library, present on the server, to the local library of the receiver device. Then, once it has been downloaded to the local library of the receiver device, such graphic and/or audio element may be freely inserted by the receiver in a new message to be sent as sender.

US2015/0327033 describes a messaging system in which zero width (ZW) Unicode sequences are inserted in the message itself to send a message which contains graphics and in order to univocally identify these graphic elements.

U.S. Pat. No. 9,699,299 describes a messaging system for sending messages containing graphic and/or audio elements associated with tags, which are intended to be typed—via keyboard—by the sender user when preparing a message to be sent. Moreover, in this messaging system, each tag can be associated with multiple graphic and/or audio elements. In particular, whenever the sender user types a word corresponding to a given tag during the step of preparing a new message, the software is configured to perform two queries, one directed to local library loaded in the sending device and one directed to the remote memory loaded in the central server, and this in order to identify all the graphic and/or audio elements associated with such tag. Also in this case, when a message with a graphic and/or audio element—which is not already present in the local library of receiver device—is received by the corresponding device of the receiver, such graphic and/or audio element is downloaded from the centralized library, present on the server in the local library of the receiver device. Then, once it has been downloaded to the local library of the receiver device, such graphic and/or audio element can then be freely inserted by the receiver during the step of preparing a new message to be sent as a sender, again according to the methods described above.

WO2015/122993 describes a messaging system in which the sender and the receiver can create an animation in their conversations in which the respective avatars of the sender and of the receiver interact with each other. Such system is configured so that in the message, the avatars are identified by means of the combination of values to be associated with a series of their attributes instead of being identified by a univocal code and, moreover, a code (ACC) which indicates the type of animation to create between the sender's avatar and the receiver's avatar is also inserted in the message. In order to show the message correctly, the software of the receiver device is configured to reconstruct and then show the animation of the respective avatars and in order to do so it identifies the code ACC in the message so as to retrieve a first database from the corresponding animation and identifies the individual attributes of the avatars—the sender's and the receiver's—so as to be able to locally reconstruct/assemble the avatars to be used in the animation. Furthermore, such messaging system is configured so that the animation on the display of the sender's device is created and displayed only after having received the confirmation of receipt from the receiver's device.

It is the object of the present invention to suggest a messaging system and a method for transferring, transmitting and exchanging graphic and/or audio elements in a messaging system which overcomes the above drawbacks present in the traditional art.

It is another object of the invention to suggest a system and a method which allow the user to use/insert the customized graphic and/or audio elements in the text of the messages.

It is another of the invention to suggest a system and a method which allow the user to customize the balloons (i.e. the frames which enclose the text) to be used in messages, in particular in messages in which customized graphic and/or audio elements are conveyed inside the balloon.

It is another object of the invention to suggest a system and a method which allow the users to customize the avatar (i.e. the graphic representation used by the users to identify themselves when they communicate with other users, e.g. in a chat) to be used in messages, in particular in messages in which customized graphic and/or audio elements are conveyed inside the balloon.

It is another object of the invention to suggest a system and a method which make it possible to transmit graphic and/or audio elements which are not necessarily present on the receiver's terminal.

It is another object of the invention to suggest a system and a method which ensure the correct viewing of the same graphic element both on the sender's part and on the receiver's part of the message.

It is another object of the invention to suggest a system and a method in which the user can easily create a graphic and/or audio element and can make it available to other users so which they can use it in their messages.

It is another object of the invention to suggest a system and a method in which the user can easily and quickly synchronize graphic and/or audio elements to be used in messages on multiple terminals and keep them synchronized.

It is another object to suggest a system and a method in which users can actively use (i.e. insert in a message of which they are the sender) only the graphic elements they created and/or purchased and/or—in general—they are authorized to use, while at the same time the receivers of a message can correctly display all graphic elements, i.e. even those they did not create and/or purchase and/or for which they are not authorized.

It is another object of the invention to suggest a system and a method in which graphic elements to be used in messages are independent from the Unicode encoding standard and which are not therefore subject to approval by the Unicode Consortium.

It is another object of the invention to suggest a system and a method which improve the traditional ones and/or are alternative to them.

It is another object of the invention to suggest a system and a method with an alternative characterization, in terms of both function and implementation, with respect to the traditional ones.

It is another object of the invention to suggest a system and a method which are simple, easy and intuitive to use.

It is another object of the invention to suggest a system and a method which allows a lower consumption of resources by the involved hardware devices and less use of the bandwidth occupied by the network.

It is another object of the invention to suggest a system and a method which can be implemented in simple, quick and cost-effective manner.

All these objects and others which will become apparent from the description which follows are achieved, according to the invention, by the system having the characteristics indicated in claim 1 and with the method having the characteristics set forth in claim 43 and/or 44.

Figure 2:
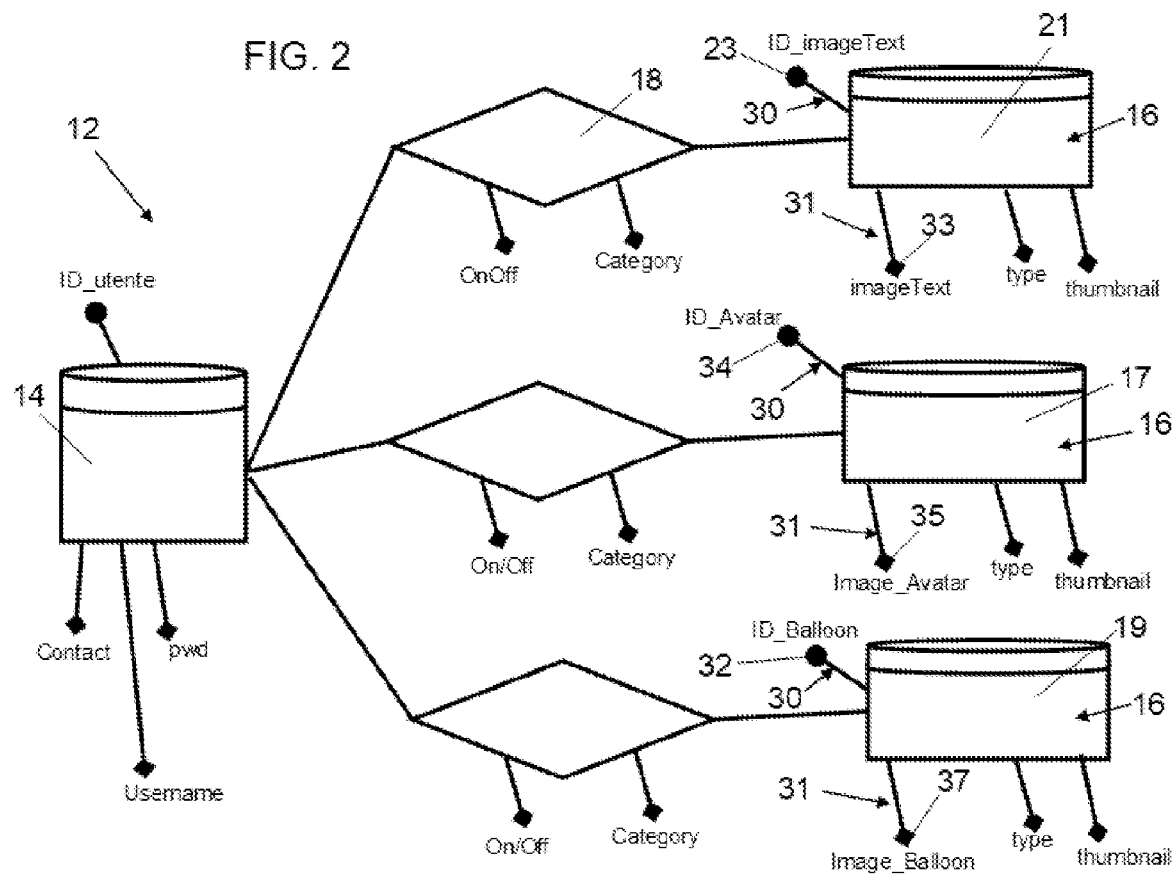
Figure 3:
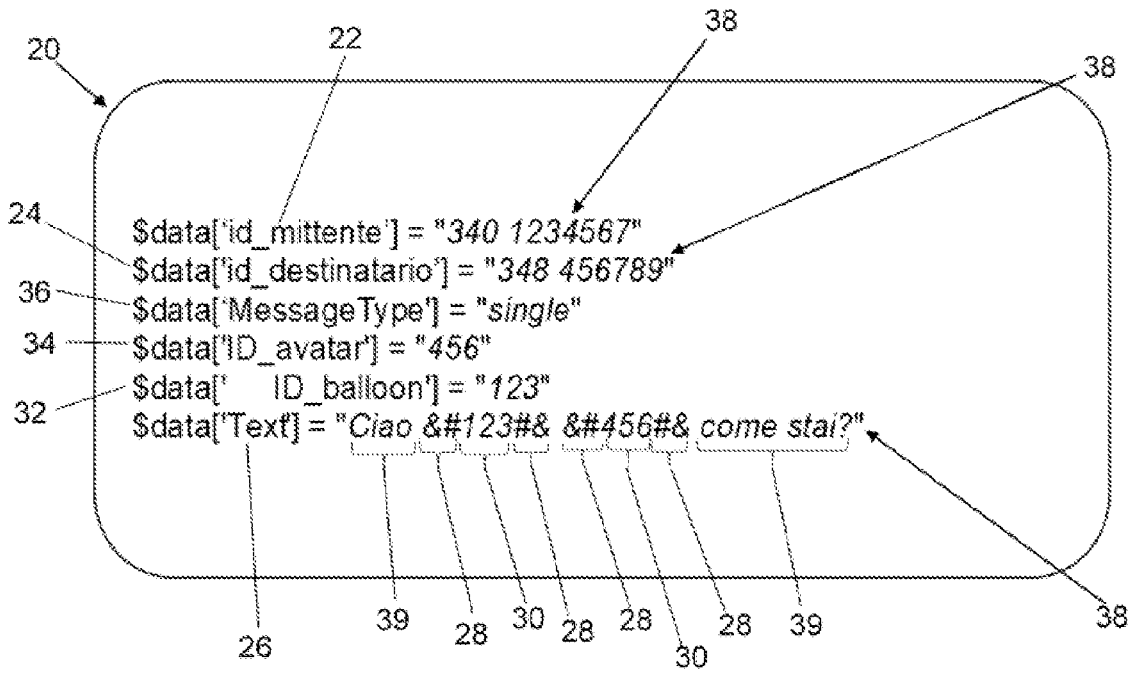
Figure 4:
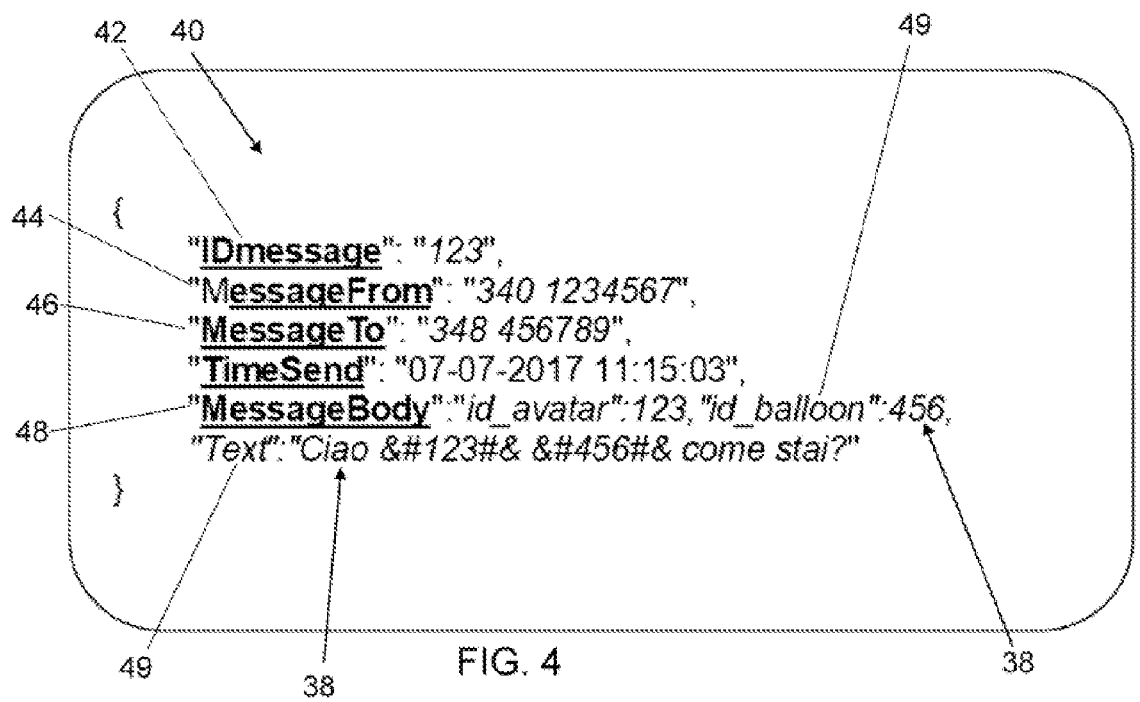
Figure 5:
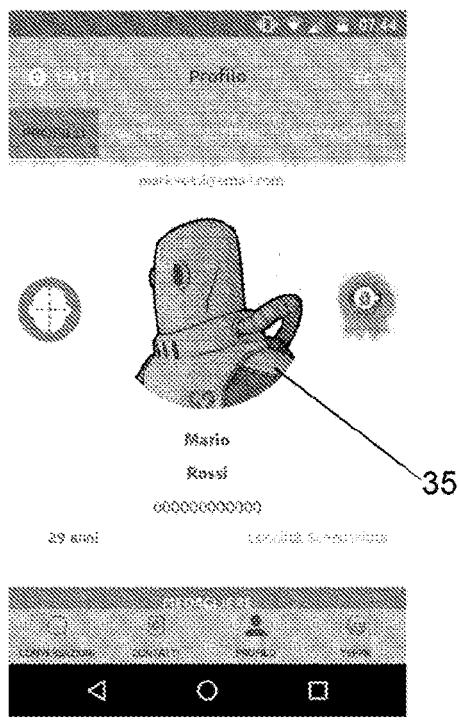
Figure 6:
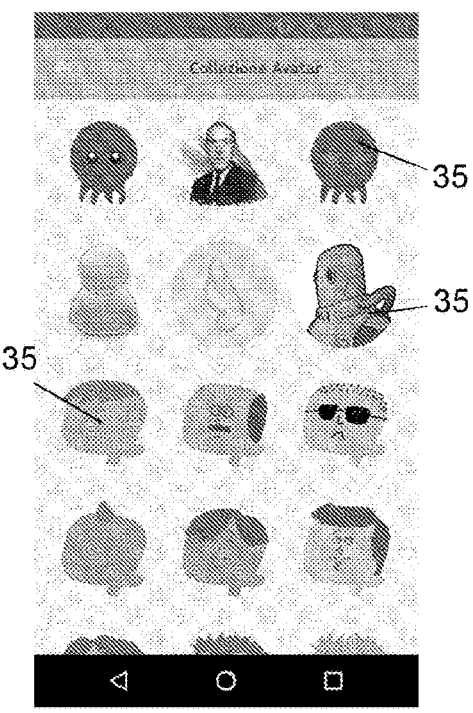
Figure 7:
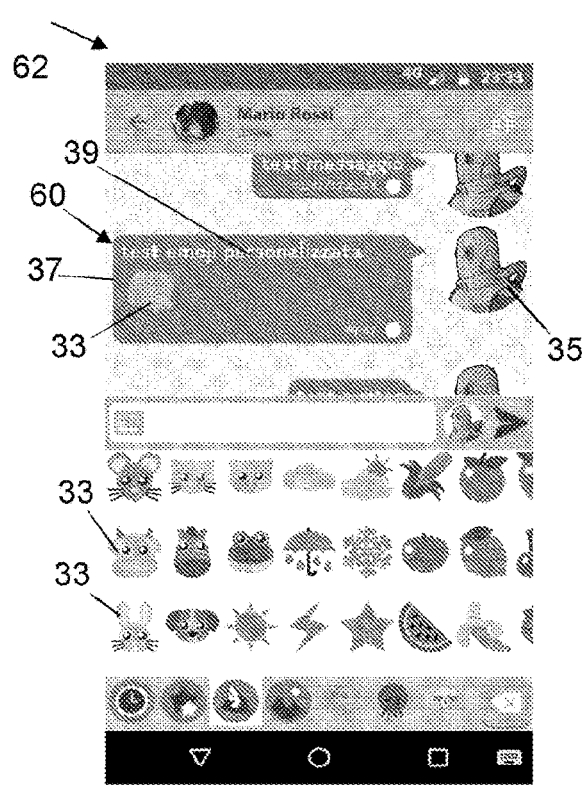
Figure 8:
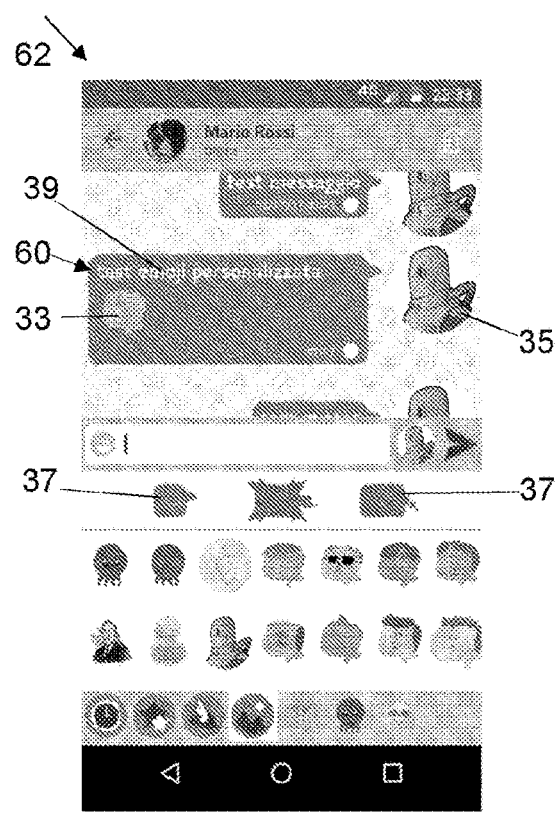
Figure 9:
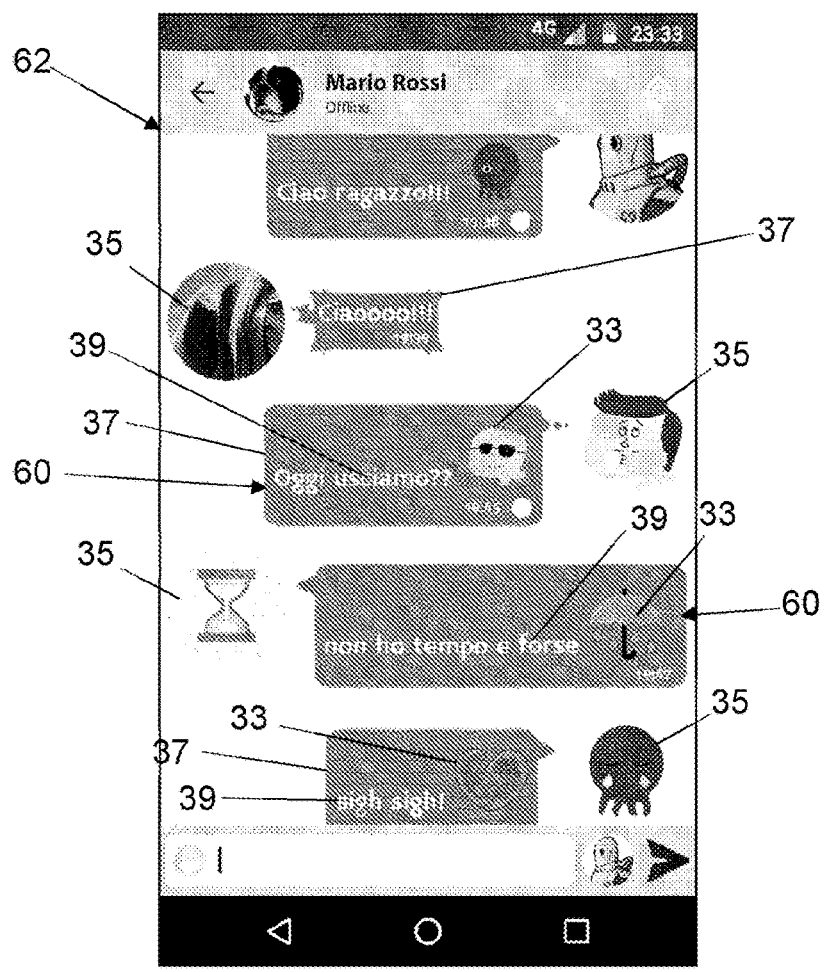
Figure 10:
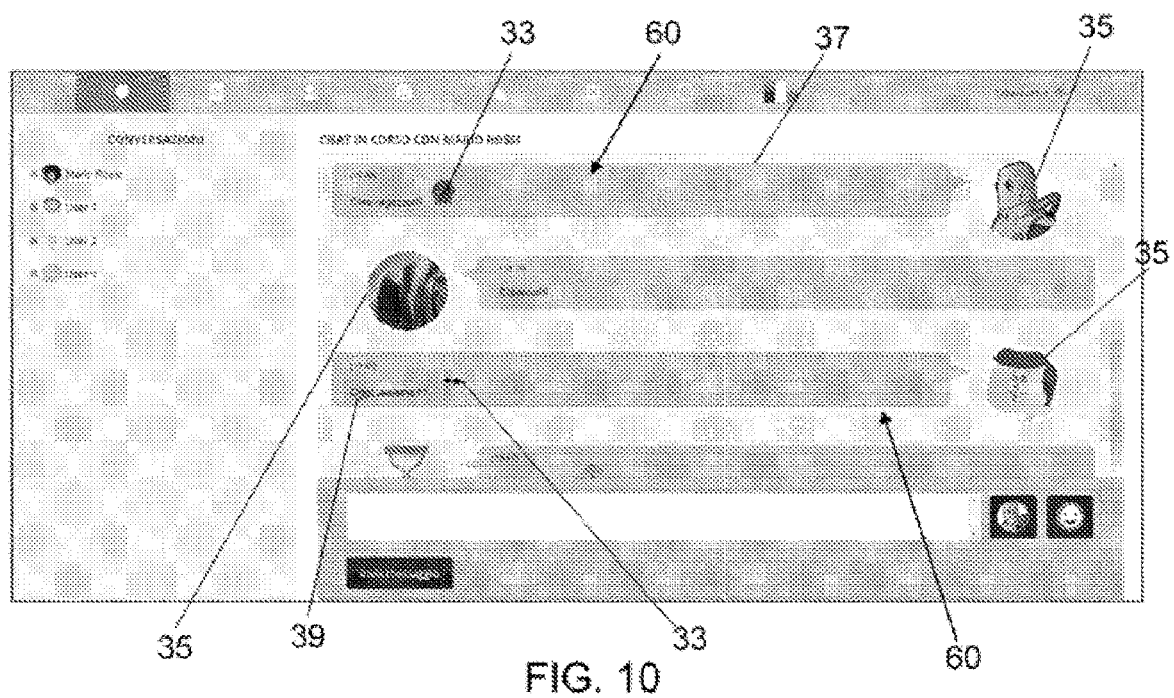
Figure 11:
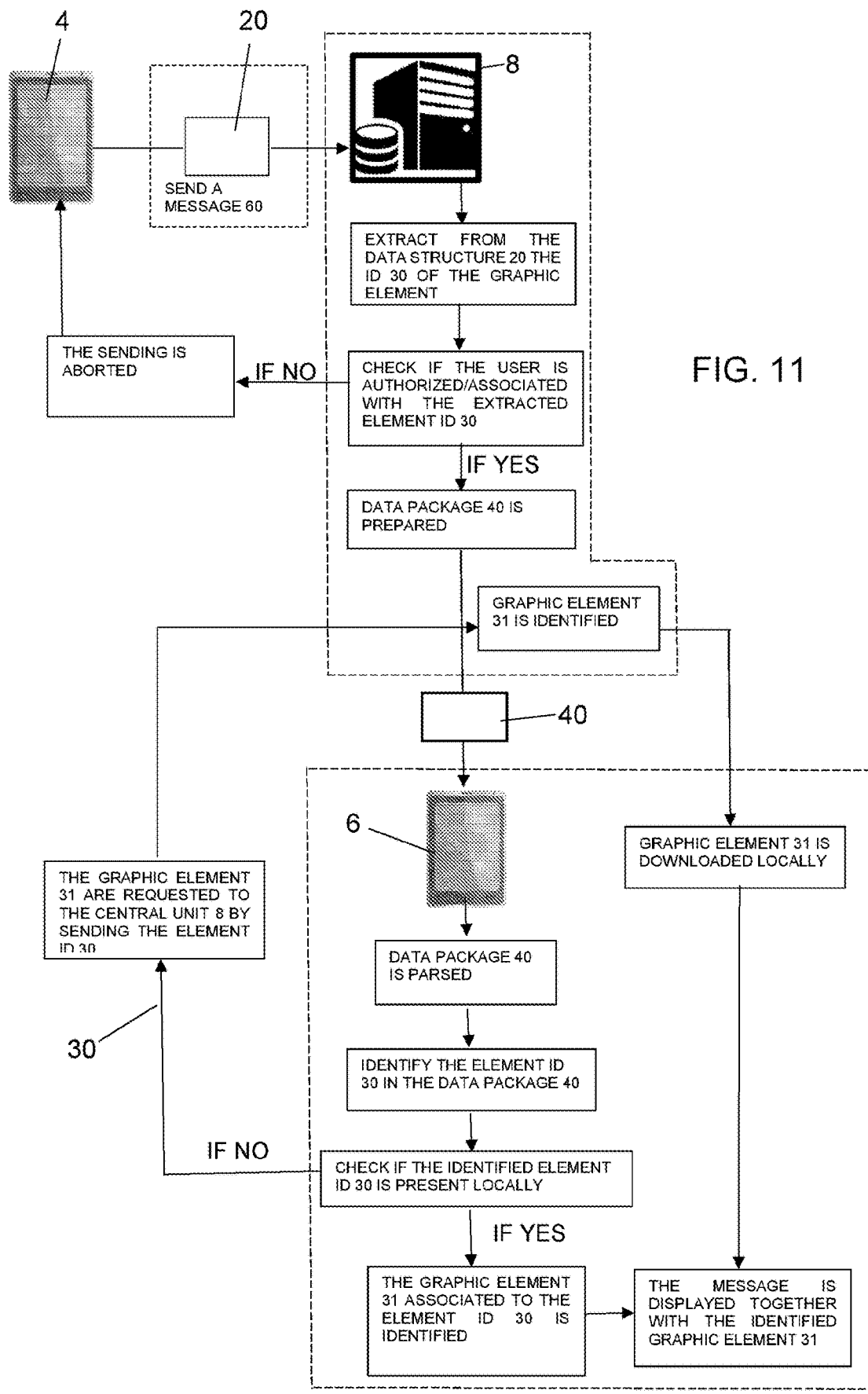
Figure 12:
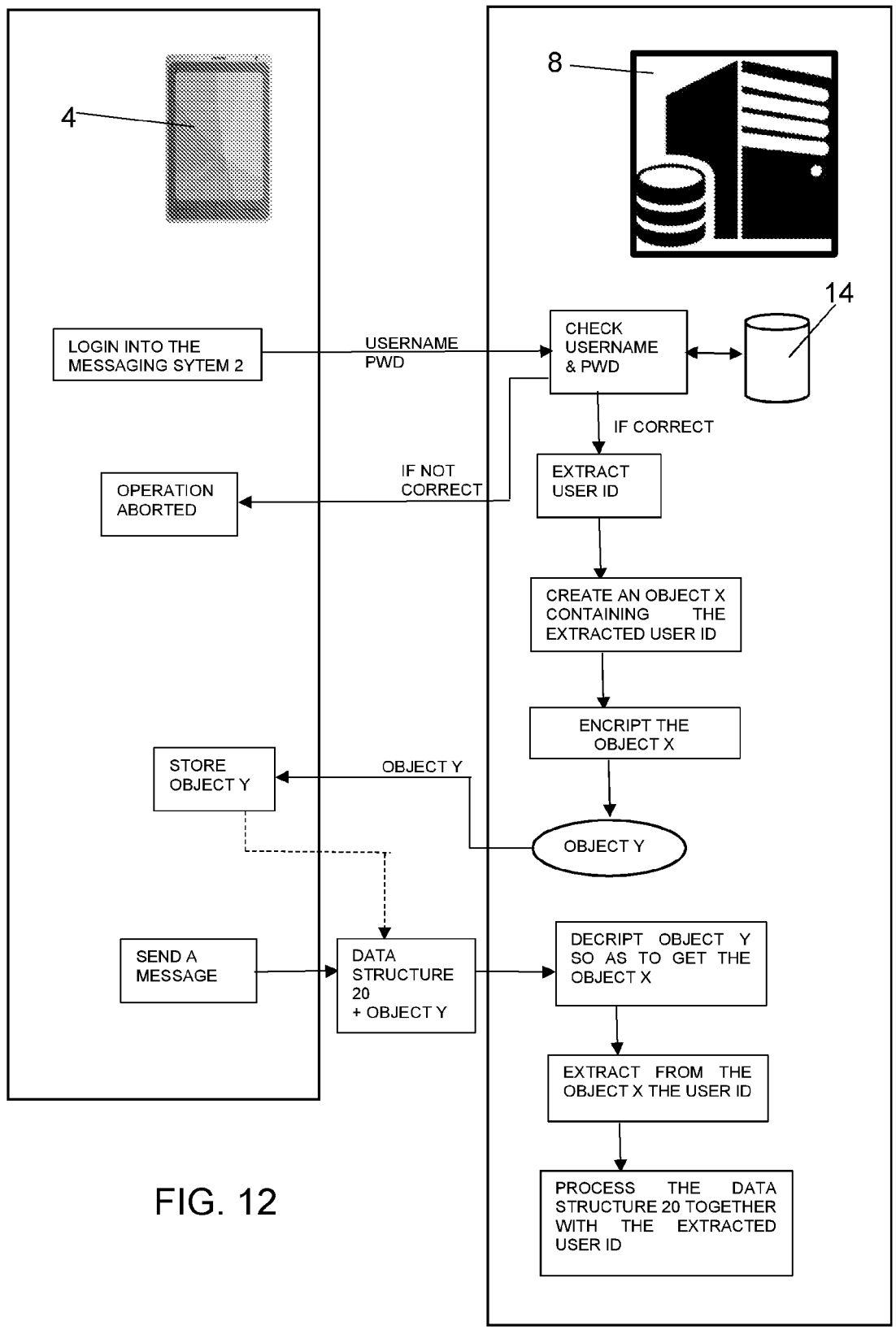
Figure 13:
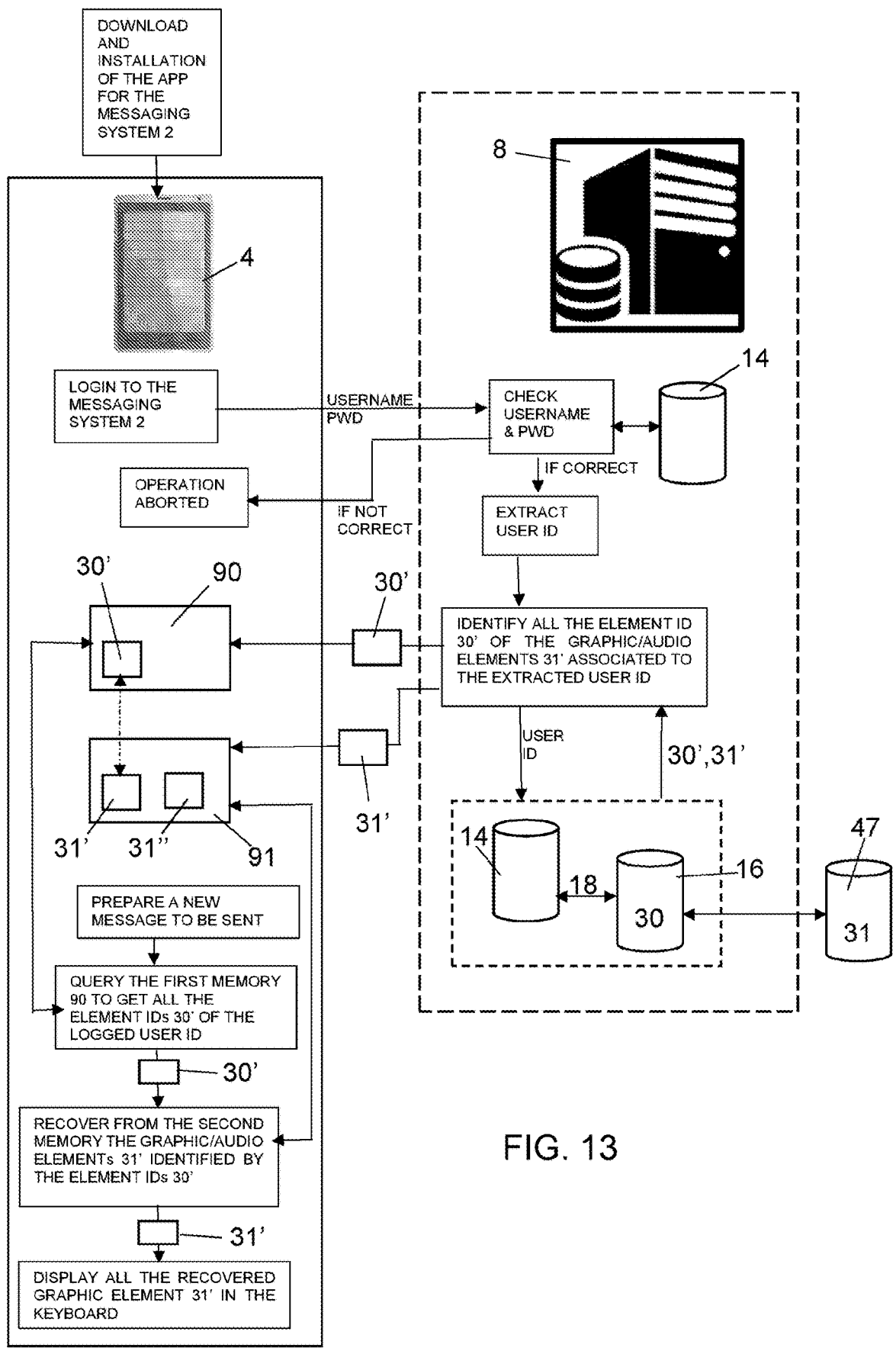

The present invention is further explained by means of a preferred embodiment given by way of non-limiting practical example only with reference to the accompanying drawings, in which:

FIG. 1 shows a diagrammatic view of the infrastructure of the messaging system according to the invention, FIG. 2 diagrammatically shows the implementation of the database, FIG. 3 shows an example of the data structure sent by the sender terminal to the central unit, FIG. 4 shows an example of the structured data package processed by the central unit, FIG. 5 shows an example of the avatar selection screen, FIG. 6 shows an example of the screen showing the avatar library, FIG. 7 shows an example of the screen of a chat with the library of graphic elements to be inserted in the text, FIG. 8 shows an example of the screen of a chat with the balloon library, FIG. 9 shows an example of the screen of a chat in a portable device, and FIG. 10 shows an example of the screen of a chat in a browser of a computer, FIG. 11 shows a flow chart of the steps provided in the sending of a message from a sender to receiver in the messaging system according to the invention, FIG. 12 shows a flow chart of the operation of the architecture/mechanism for ensuring the correctness of the identity of a user sender in the messaging system according to the invention, and FIG. 13 shows a flow chart of the operation of the architecture/mechanism to synchronize and use only the authorized graphics/audio in the sender device.

Preliminarily, it is worth noting that hereinafter the word "message" 60 means the set of all elements, either textual, graphic (both static and animated) and/or audio and/or video, which are represented in the display screen in a single frame, which is also named "balloon" hereinafter, or which are shown on the screen either spaced apart or graphically disconnected from other messages in the chat. The word "avatar" means the graphic representation used by users to identify themselves when they communicate with other users, e.g. in a chat, or when sending a message.

As shown in the figures, the infrastructure of the messaging system according to the invention, indicated as a whole by reference numeral 2, comprises at least one sender device 4 and at least one receiver device 6, which are provided with communication means for transmitting and receiving data to and from at least one central unit 8.

Advantageously, the data is transferred between devices 4, 6 and the central unit 8 according to a traditional client-server architecture which uses, for example, HTTP (Hyper-Text Transfer Protocol). Preferably, such transfer/communication protocol is secured, i.e. is for example of the HTTPS type, by using an encrypted connection, e.g. according to Transport Layer Security (TLS) or Secure Sockets Layer (SSL) encrypted protocols.

Preferably, the sender device 4 and/or the receiver device 6 comprises a client constituted by a computer or a device of portable type, e.g. smartphone or tablet. Preferably, the central unit 8 comprises at least one processor 10, e.g. such as a virtual or real remote server and/or a cloud system.

Furthermore, at least one database 12 is loaded in of the central unit 8 which is provided, in conventional manner, with data storage media and with a processor for processing the data (database server), and software applications (i.e. a database management system) for creating, manipulating, managing and efficiently querying data stored on the media.

As shown in FIG. 2, the central database 12 comprises:

a user dataset 14 containing the data of each user of the system; in particular, such dataset contains at least one univocal identification code ID for the user, a username and a password, and preferably also the name and surname, a reference to be contacted (e.g. the e-mail address) and other conventional recording data, one or more element datasets 16 containing at least the univocal identification codes (ID) of all graphic elements (both static and animated) and/or audio and/or video 31 which can be managed by the messaging system 2; in particular, in the case of a graphic element, such dataset contains at least the univocal identification code (ID) 30 for each graphic element.

Appropriately, in particular, in the case of graphic elements, the same element dataset 16 may also contain data which define the actual image 31 (i.e. the bitmap numerical representation, preferably according to the base 64 or vector encoding of the digital image), the type and/or a description of the image, a thumbnail of the image and the identification code ID of the author/creator of such graphic element.

Preferably, the element dataset 16 contains, in addition to the univocal identification code (ID) 30 of the graphic and/or audio element 31, an address/location (e.g. a web URL) of another database 47, possibly cloud-based—and preferably the address or precise location of the corresponding records in the database 47—in which the data which define the actual graphic and/or audio element 31 are stored in an organized manner. Advantageously, according to a preferred embodiment, in the dataset 16 of central database 12, the univocal identification code (ID) 30 of the graphic and/or audio element 31 corresponds to the address/univocal location (preferably web-based) which identifies the record in the further database 47 (possibly cloud-based) in which the data which define the actual element 31 are stored.

Conveniently, all the graphic and/or audio and/or video elements 31 which can be transferred by the messaging system 2 according to the invention are univocally identified in the database 12 by the univocal identification code 30 of the element dataset 16. In particular, this means that, in the database 12, each graphic and/or audio and/or video element 31 which can be managed and transferred by the messaging system 2 is provided with its own univocal identification code which is therefore certainly distinct and different from which of all other graphic and/or audio elements. Preferably, the univocal identification code 30 of each graphic and/or audio and/or video element 31 of the element datasets 16 is created in a random or predetermined manner (and then associated) by a specific allocation software module provided in the database 12 and/or in the central unit 8.

Appropriately, the database 12 is configured and structured so that the user dataset 14 and the element dataset 16 are mutually associated by means of a relationship 18 (which substantially constitutes another dataset) containing the elements 31 of the dataset 16 which are available/usable/manageable by each user of the dataset 14.

Preferably, each row of the relationship dataset 18 contains the univocal identification code ID for a user (as it derives from the user dataset 14), a univocal identification code 30 of a graphic and/or audio element 31 (as it derives from the element dataset 16) which is associated with that given user and an indication of whether such user is enabled/authorized to use this graphic and/or audio element 31 in the messaging system 2 or not.

Appropriately, the database 12 is configured and structured so that, in the relationship 18, the same graphic and/or audio element of the dataset 16 can be associated with, and then managed by, multiple users of the dataset 14. Appropriately, according to the invention, it is understood that the database 12 of central unit 8 contains the data of all the graphic and/or audio elements of all users.

Advantageously, in this manner, i.e. by correlating each user with one or more graphic and/or audio elements 31 (and therefore also vice versa, i.e. by putting each graphic and/or audio element into relationship with one or more users), an architecture is defined in which users can manage and use in active manner (i.e. as a sender in a message) only the graphic and/or audio elements 31 associated with them, as provided by the relationships 18 between datasets 14 and 16. Substantially, a given user is enabled/authorized to insert a given graphic and/or audio element 31 in a message to be sent only if there is a relationship 18 between such user and said element, and in particular if the univocal identification code ID of the user is in relationship with the univocal identification code 30 of said element.

Appropriately, the relationship 18—which indeed makes it possible to enable/authorize a given user to use a particular graphic and/or audio element 31 in a message to be sent—can be created when the user is the subject who created/uploaded such graphic and/or audio element in the messaging system 2 and/or when the user was authorized—e.g. because they acquired it free of charge or following payment of a fee—to use such a graphic and/or audio element in the messaging system 2.

Appropriately, the database 12 is configured and structured so that the user dataset 14 and element dataset 16 are mutually associated by means of two types of relationships 18 (which therefore substantially define two additional datasets) containing the elements of the dataset 16 which were created by every one of the users of the dataset 14 and elements of the dataset 16 for which each user of the dataset 14 was authorized/enabled (e.g. because they purchased it), respectively.

Advantageously, as shown in FIG. 2, the element dataset 16 comprises a first dataset 21 containing the data and/or references (i.e. the addresses or the location in another database 47) of symbols and icons or images in general 33 to be inserted, with or in any text 39, inside the balloon of the message itself, as well as a univocal identification code (ID) 23 of such images 33 which can be inserted with or in the text of the message. Preferably, but not necessarily, these images 33 represent a concept, an emotion or a state of mind, substantially in a manner corresponding to emojis.

Advantageously, as shown in FIG. 2, the element dataset 16 comprises a second dataset 17 which contains the data (at least one univocal identification code) and/or the references (i.e. the addresses or the location in another database) of symbols, icons or images in general to use as avatar 35, as well as its univocal identification code (ID) 34.

Advantageously, as shown in FIG. 2, the element dataset 16 comprises a third dataset 19 which contains the data (at least one univocal identification code) and/or the references (i.e. the addresses or the location in another database) of balloons 37 of different shapes or sizes which enclose the text of the message, as well as its univocal identification code (ID) 32.

Conveniently, any subject, as author, and not necessarily identified/recorded in the user dataset 14, can generate a graphic and/or audio element and upload it appropriately into the element dataset 16 of the database 12 so that it is available to users of the system 2, as identified/registered in the user dataset 14, and thus allow them to download, from the database 12 locally to their devices, graphic and/or audio elements identified by the univocal identification codes 30 present in the element dataset 16 so as to be able to use them in the messages to be sent in the messaging system 2, as will be better explained below.

The sender device 4 and receiver device 6 are configured to send and receive text messages 60 over the network or via the Internet or locally by means of the central unit 8 with which both devices are communicating.

A first software module is loaded and run in the sender device 4 and/or the receiver device 6. Conveniently, in the case of portable device, such as which smartphone or tablet, the first software module consists of a mobile software application, also known as app.

The first software module of the device 4, 6 is also configured to load in the database 12 of the central unit 8 a graphic and/or audio element generated by a user (author) in order to make it available also of other users of the messaging system 2. In particular, for this purpose, the first software module sends a particular graphic and/or audio element 31, which was generated or is available locally on a device to the central unit 8, and the central unit 8 stores it in the database 12 by associating a univocal identification code 30 with them. Conveniently, for a graphic and/or audio element 31 to be used/inserted by a sender user in a message 60, the graphic element 31 with its univocal identification code 30 must be available/present in the local memory of the sender device 4 so that the univocal identification code 30 can be appropriately inserted in the message 60, and so in the data structure 20 sent to the central unit 8, according to the methods described below.

Appropriately, the messaging system 2 also comprises a second software module, which is loaded and run in the central unit 8 and is configured to define a new relationship 18 which associates a corresponding graphic and/or audio element 31 (and in particular associates the univocal identification code 30 of graphic and/or audio element 31 with the univocal identification code ID for that user) with a user, and vice versa, so that the user can use only the graphic and/or audio elements 31 which are associated with the user by means of a relationship 18 in the messages to be sent.

Preferably, the first software module is configured so that on the display on the sender device 4 of a given user a keyboard is shown containing only the graphic and/or audio elements 31 which are associated with such user by means of a relationship of 18, i.e. for which the users were authorized/enabled as a creator of the graphic and/or audio element or, for example, because they purchased it.

Advantageously, the first software module is configured so that the users of the system 2, thus identified and already recorded in the user dataset 14, can upload to the messaging system 2 (and in particular send to the database 12 of the central unit 8) a graphic and/or audio element they created; in particular, in such case, the second software module—loaded and running in the central unit 8—is configured to create a new relationship 18 (preferably of the first type defined above) which associates the univocal identification code 31 of graphic and/or audio element 31 thus uploaded with the identification code of the user.

Advantageously, the first software module is configured so that the users of the system 2, thus identified and already registered in the user dataset 14, may ask to obtain authorization/enabling—e.g. by means of a direct or indirect purchase, free of charge or following payment of a fee—to use a graphic and/or audio element created by other users in a message to be sent; in particular, also in such case, the second software module is configured to create a new relationship 18 (preferably of the second type defined above) which associates the univocal identification code 31 of graphic and/or audio element 31 thus authorized/enabled with the identification code of the user.

In particular, the first software module is also configured to send text messages 60 by sending a request to the central unit 8 (server) on the basis of a communication protocol, preferably HTTPS. Advantageously, this request is performed by means of the POST method so as to send a data structure 20 to the central unit 8 without showing in the query string, however such request could also be performed by means of the GET method, thereby passing the data in the search string.

Appropriately, the data structure 20 (named "$data" in FIG. 3), which is generated by the first software module, contains all the data/values/record fields to be sent in input to the second software module which is loaded and running in the processor 10 of the central unit 8.

In more detail, as shown in FIG. 3, the data structure 20 contains the following fields:
identification code field of the conversation ("id_conversation") and/or of the receiver 24 (i.e. "id_receiver"),
the text field of the message 26 (i.e. "Text").

Conveniently, in an embodiment, the data structure 20 may also contain a field identifying the sender 22 (i.e. "id_sender"), In particular, the text field 26 contains both text 39 (i.e. the set of words which form the message) is the univocal identification code 30 of a graphic and/or audio element 31. Appropriately, this univocal identification code 30, which is inserted in the text field 26, is appropriately positioned upstream and/or downstream, between precoded labels/characters/symbols 28. In more detail, as shown in FIG. 3, the identification code "123" of a first graphic element is inserted between the precoded characters "&#" and the same applies for the identification code "456" of a second graphic element.

Advantageously, the data structure 20 also comprises a field to univocally identify the balloon 32 (i.e. "ID_balloon") and a field to univocally identify the avatar 34 (i.e. "ID_avatar"). Advantageously, the data structure also comprises a field to define the type of message 36 (i.e. "MessageType") and to indicate whether it is a message sent to a single receiver or to multiple receivers.

Appropriately, the first software module is configured to allocate to the fields 22, 24, 26, 32, 34 and 36 of the data structure 20 the corresponding values 38 which are set and selected by the user by interacting with the graphic interface of the sender device 4 when preparing and sending a message 60 and/or are defined automatically by the software module itself. For example, the receiver identification field 24 and the message text field 26 are filled in on the basis of what the user chooses by interacting with the graphic interface of the device, while the sender identification field 22—if provided—may be filled in either directly and automatically by the software module according to the default settings on the device.

As mentioned, the second software module is loaded and run on the computer 10 of the central unit 8.

Advantageously, in a preferred embodiment, the first software module loaded in the sender device 4 and the second software module loaded in the central unit 8 are also configured to implement an architecture/procedure for authenticating the user sender (see FIG. 12) who is using the messaging system 2 and this in order to ensure the correctness of the sender user's identity in the messaging system according to the invention.

In particular, in order to implement such sender user authentication procedure, the first and the second software module are configured to perform the following actions:
the first software module of the sender device 4 sends the data (username and password), that the users enter by interacting on their sender device (4), when they log into the messaging system 2 to the second software module of the central unit 8,
the second software module of the central unit 8 verifies the received data (i.e. controls—preferably by querying the user dataset 14—if as a whole they correspond to a user who is already registered in the messaging system), extracts the identification code ID of the corresponding user and generates a corresponding computer object X containing such code, among other data,
the second software module of the central unit 8 encrypts the computer object X with a private key, thus generating the encrypted computer object Y,
the second software module of the central unit 8 sends the encrypted computer object Y to the first software module of the sender device 4, which temporarily stores it.

Appropriately, the following operations are performed when a user sends—by means of the sender device 4—a text message 60:
the first software module sends both the data structure 20 and the previously received encrypted computer object Y to the central unit 8,
the second software module of the central unit 8, preferably before processing the data structure 20, decrypts the encrypted computer object Y and thus extracts the computer object X containing the user ID, the second software module of the central unit 8 processes the data structure 20 having also the identification code ID of the user at its disposal.

Appropriately, it is understood that if the data structure 20 does not contains the identification code field of the sender 22 in it. Advantageously, in this manner, only the central unit 8 knows, possesses, extracts and verifies the identification codes ID of the corresponding users, so that the first software module of the sender device 4 does not have to retrieve and send (in plaintext, i.e. non-encrypted manner) the code of the user sender to the central unit 8, with the possible risk of alterations or modifications on client side. Therefore, for each data structure 20, and consequently for each message sent, the central unit 8 can derive in certain manner—and without the possibility/danger of alterations—who is the user sender of said message, thus authenticating the user's identity and also ensuring that the user is registered in the messaging system 2.

Advantageously, as a further security check (see FIG. 11) in order to prevent users in the messaging system 2 from using graphic and/or audio elements 31 for which they are not correctly or actually authorized/enabled in messages to be sent, the second software module loaded and in the central unit 8 is configured so as to:

extract the univocal identification code 30 of a graphic and/or audio element 31 from the data structure 20 (which was sent to said unit 8 by the sender device 4), verify whether the user who sent the data structure 20—and whose identification code ID was retrieved preferably during the step of authenticating described above—is enabled/authorized to use/insert the graphic and/or audio element 31 associated with the previously extracted univocal identification code 30 in the messages to be sent; in particular, for this purpose, the database 12 is queried to verify whether there are any relationships 18 which associate the identification code of the user who sent the data structure 20 using the sender device 4 (and whose data result from the user dataset 14) and the univocal identification code 30 which was extracted by the structure 20 (and whose data result from the element dataset 16); more in detail, for example, a first query can be run to verify whether there is a first type of relationship 18 (i.e. whether the user is the subject who created/loaded the graphic and/or audio element in the messaging system 2), and only in case of negative result of such first query, a second question to verify is run to verify whether there is a second type of relationship 18 (i.e. if the user was enabled/authorized to use the graphic and/or audio element in the messaging system 2, e.g. as a result of a purchase);

if the result of the check is positive, the method then continues processing of the request sent by the sender device so as to return a structured data package 40 in a format suited for data exchange; on the contrary, instead, in case of negative result of the check, the processing of the request sent by the sender device 4 is interrupted/blocked and, appropriately, a corresponding alert can be automatically sent to the latter.

In particular, as mentioned, the second software module is configured to process the request sent by the sender device and thus return a structured data package 40 in an appropriate format for the data exchange. Preferably, the data package 40 is in "json" format but may also be in other formats, e.g. "yaml" or "xml".

In particular, the data package 40 contains a series of fields 42 to which the values 38 of the fields of the data structure 20 sent by the sender device 4 are appropriately assigned and/or to which the values are automatically derived from the second software module are assigned. Preferably, the data package 40 comprises the data of the message 60 created by the sender and needed to correctly transmit such message to the receiver and to allow the latter to view the message 60 on their device.

In more detail, as shown in FIG. 4, the structured data package 40 comprises the following fields:

an ID field 42, which univocally identifies the data package 40 (i.e. the "IDmessage" field) and which is filled in automatically by the second software module by assigning a random numeric or alphanumeric or default code, a sender field 44 (i.e. the "MessageFrom" field) to which the value of the sender field 22 of the data structure 20 or, preferably, the value of the identifying code ID of the corresponding user sender obtained by the central unit 8 starting from the encrypted computer object Y is assigned, as well as preferably provided in the authentication procedure described above and shown in FIG. 12, a receiver field 46 (i.e. the "MessageTo" field) and to which the value of the receiver field 24 of the data structure 20 is assigned, a field 48 related to the body of the message (i.e. the "MessageBody" field) and which contains the value 38 of the text message 26 field of the data structure 20 and preferably also the label (tag) 49 of this field; advantageously, the message body field 48 also contains both the label (tag) 49 and the corresponding values 38 of the avatar identification field 32 and of the balloon identification field 34 of the data structure 20.

Essentially, the structured data package 40 contains a message body field 48, which contains both the labels 49 (i.e. the metadata) of the text fields message 26, avatar identification 32 and balloon identification 34 of the data structure 20, and the corresponding values 38 (i.e. the data) assigned to these fields within the structure itself.

Advantageously, the structured data package 40 also comprises a field to which the corresponding date and/or time values at which the message 60 has been sent by the sender device 6 and/or at which the central unit 8 received the data structure 20 are assigned.

The first software module loaded and run in the receiver device 6 is configured to download a data package structured 40 prepared by said unit and addressed to said device from the central unit 8. Preferably, the downloading from the central unit 8 of structured data package 40 by the receiver device 6, or in any case the transmission of the structured data package 40 from the central unit 8 to the receiver device 6, is performed by means of a REpresentational State Transfer (REST) architecture preferably, but not necessarily, used on HTTPS protocol.

Advantageously, the first software module loaded and running in the receiver device 6 may be configured to periodically access, according to a predefined frequency, the central unit 8 to query it on whether one or more structured data packages 40 (i.e. messages) are present/available for it—thus following a client-server dialog mode named "polling"—and, in the positive case, download such structured data package 40 from the central unit 8.

Preferably, as shown in FIG. 1, the system 2 according to the invention further comprises a notifying platform 50, such as for example Google Cloud Messaging or Apple Push Notification Service, which acts as a mediator between the devices 4, 6 and the central unit 8 and which is configured to alert said devices, asynchronously, when new data addressed for them, therefore following a mode called "push notification" are available in the central unit. In particular, for this purpose, the second software module is also configured so that, after having processed and prepared the structured data package 40 on the basis of the data structure 20 sent by the sender device 4, it sends an alert 52 on the notifying platform 50, which is then configured to forward such alert to the corresponding receiver device 6. Appropriately, the alert 52 that the central unit 8 sends to the notifying platform 50 comprises an identification code of the central unit 8 which sends the alert, the identification code of the receiver device 6 to which the notice must be sent and the contents of such alert 52. Appropriately, the contents of such alert which is sent to the receiver device, comprises at least the field 42 which univocally identifies the structured data package 40, so as to allow the receiver device 6 which received such alert 52 to directly query the central unit 8 in order to download the structured data package 40 identified by such code.

It is also understood that, in an embodiment not shown here, the alert 52 sent by the central unit to the notifying platform 50, and from this to the receiver device 6, comprises the entire structured data package 40. In other words, the central unit 8 immediately sends to the receiver device 6, by means of the platform 50, the entire structured data package 40, which is thus downloaded locally by the device itself without having to directly query the central unit 8.

Preferably, the first software module loaded in the sender device 4 and/or the receiver device 6 is configured to have a first active state, in which a bidirectional connection with the central unit 8 is established and maintained, and a second resting state, in which the sender device 4 and/or the receiver device 6 are not connected with the central unit 8. Advantageously, the first software module is also configured so that, when it is in said first active state, the receiver device 6 queries the central unit 8 is not periodically (i.e. according to the "polling" mode), but only when it receives an alert 52, preferably by means of the notifying platform 50 and according to the mode named "push notification". Appropriately, in corresponding manner, when new data addressed for a given receiver device 6 in which the first software module is in an active state are available in the central unit 8, the second software module is configured so as to send an alert 52 to said receiver device 6 to query the central unit 8.

Appropriately, when new data addressed for a given receiver device 6 in which the first software module is in a resting state are available in the central unit 8, the second software module is also configured to send an alert 52—preferably by means of the notifying platform 50 and according to the mode named "push notification"—to said receiver device 6 so as to warn it to go to the first active state.

In substance, in so doing, it queries the central unit 8 only when there are new data to download, thereby avoiding querying it periodically and unnecessarily; this is particularly advantageous because it makes it possible to decrease data traffic and above all to avoid unnecessarily consuming data transmission bandwidth.

Advantageously, the sender device 4 and/or the receiver 6 comprises:

a first local memory 90 in which to download and store the identification codes 30 of all graphic and/or audio elements 31 which are associated (by means of a relationship 18) with the univocal identification code of the given user who logged into the messaging system 2 by using said sender device 4 and/or said receiver device 6, a second local memory 91 in which to download and store all the graphic and/or audio elements 31 corresponding to the identification codes 30 downloaded and stored in the first memory.

Preferably, the first and second local memories are both mass memories or primary memories or RAM memories. Preferably, the second local memory 91 is of the cache type.

In particular, as shown in the flow chart in FIG. 13, the first software module loaded and run in the sender device 4 and/or the receiver device 6 and the second software module loaded onto the central unit 8 are also configured so that:

the first software module of the sender device 4 sends the data (username and password), that the users enter by interacting with their device 4 and/or 6) when they log into the messaging system 2, to the central unit 8 the second software module of the central unit 8 verifies the login data thus received (i.e. checks—preferably by querying the user dataset 14—whether as a whole they correspond to a user already registered to the messaging system), extracts the identifying code ID of the corresponding user and, using the code thus extracted, identifies the univocal identification codes 30' of all graphic and/or audio elements 31' which are associated, by means of a relationship of 18, with the identifying code ID of such user, the first software module of the sender device 4 downloads the univocal identification codes 30' of all graphic and/or audio elements 31' thus identified to the first local memory 90 of the device 4 and/or 6, the first software module of the sender device 4 downloads the graphic and/or audio elements 31' thus identified to the second local memory 91 of the device 4 and/or 6.

Preferably, such operations are performed at the time of the first use of the messaging system 2, once the first software module (app) has been downloaded and installed on the sender device 4 and/or the receiver device 6. Conveniently, the preliminary synchronization of sender device 4 and/or the receiver device 6 are performed in this manner.

Appropriately, the first software module of the sender device 4 and/or the receiver device 6 is configured so as to show a keyboard on the display of the device itself—and this in order to create a message to be sent —, which has access, and such shows on said display, only graphic and/or audio elements 31' the univocal identification codes 30' of which are stored in the first memory of the device itself.

Appropriately, the first software module which runs in the sender device 4 is configured to perform the following operations:

retrieving a list of the univocal identification codes 30' present in the first local memory 90 of the sender device 4, using such codes 30', retrieving the corresponding graphic and/or audio elements 31' from the second local memory 91 of the sender device 4, displaying the graphic and/or audio elements 31' thus retrieved on the keyboard of the sender device 4.

The first software module loaded and running in the receiver device 6 is also configured to process the structured data package 40 which is downloaded from the central unit 8 so as to extract/decode the contents of the fields 42, 44, 46 and 48 of such package.

In particular, this software module is configured to parse the contents of the message body field 48 of the structured data package 40 so as to obtain the values 38 of the message text fields 26, the balloon identification 32 and/or the avatar identification 32.

In more detail, the first software module is configured to:

search—directly inside the message body field 48 of the structured data package 40 and/or in the value 38 in the text field 26, once the latter has been identified by its label 49 inside the message body field 48—the precoded labels/characters/symbols 28 so as to identify the univocal codes 30 of the graphic elements, check whether the graphic elements 31 identified by the extracted univocal codes 30 are already present in the local memory of the receiver device 6; preferably, for this purpose, search the univocal identification codes 30' present in the first local memory 90 of the receiver device 6 and, if they are not already present in the local memory of the receiver device 6, send a request to the central unit 8, so as to download graphic elements 31" identified by univocal codes 30 identified in the structured data package 40 and not present in the first local memory 90 to the local memory of the receiver device 6—preferably to the second local memory 91 of the receiver device 6.

So, appropriately, the graphic and/or audio elements 31" which are downloaded when given structured data packages 40 are received are also stored in the second local memory 91 of the receiver device 6 and this in order to always display all the graphic and/or audio elements contained in the received message correctly.

So, in more detail, the following are stored/preserved in the second local memory 91 of any device 4 and/or 6:

a first set of graphic and/or audio elements 31' the univocal codes 30' of which are stored/present in the first local memory 90; In particular, these are graphic and/or audio elements 31' which, in the central database 12, are associated with a given user by means of a relationship 18 because such user created/uploaded them in the messaging system or because the user was authorized/enabled to use them (e.g. following a direct or indirect purchase), a second set of graphic and/or audio elements 31' the univocal codes of which are not stored/present in the first local memory 90 instead; in particular, these are graphic and/or audio elements 31 which were downloaded from the central unit 8 when a given structured data packages 40 is received, and this in order to correctly display all graphic and/or audio elements contained in the received message.

Appropriately, as mentioned, the first software module of the sender device 4 and/or the receiver device 6 is configured so as to show a keyboard on the display of the device itself—and this in order to create a message to be sent—which has access, and thus shows on said display, only the first set of the graphic and/or audio elements 31' present in the second local memory 91 of the device.

This is particularly advantageous since it makes it possible to have a messaging system in which the users can use in messages to be sent only the graphic and/or audio elements they created or for which they were authorized/enabled (e.g. as a result of a purchase), while at the same time they can always correctly display all graphic and/or audio elements present in the messages that they receive.

Appropriately, more in detail, the request—which is sent by the receiver device 6 to the central unit 8 in order to download a graphic and/or audio element the identification code 30 of which is not present in the first local memory 90 of the device itself—contains the univocal code 30 of such graphic and/or audio element, code which is then used by the software module of the central unit 8 to query the database 12 and extract the data of the graphic element univocally identified with such code 30 from the element dataset 16. So, the data of the graphic element thus identified, and in particular the actual image 31 associated with the identified identification code 30, are sent by the central unit 8 to the requesting device.

Appropriately, for this purpose, the first software module of the requesting device is configured to send a request, by means of the POST method of the HTTPS protocol, to the central unit 8 and thus download to the local memory of the requesting device, and in particular to the second local memory 91, the graphic element 31" identified by the univocal code 30 present in the message body field 48 of the structured data package 40. Preferably, the graphic element 31" may be an image 33 to be inserted, either with or in possible text 39, in the balloon of the message 60, preferably but not necessarily to represent a concept or an emotion, in a manner substantially corresponding to emojis.

Correspondingly, the first software module is configured to request and download from the central unit 8 the avatar image 35 corresponding to the avatar identification 34 and/or the balloon type 37 corresponding to the balloon identification 32 contained in the message body field 48 of the structured data package 40 downloaded from the central unit 8 if they are not already present in the local memory of the receiver device.

Appropriately, the avatar identification 34 and/or the balloon identification 32 can be managed, as described above, by means of appropriate data structure fields 20 or can be inserted directly into the text field 26 of said data structure appropriately positioned between precoded labels/characters/symbols 28. Appropriately, various precoded labels/characters/symbols 28 can be used, e.g. such as "&#", "&%" and "&^" in order to pass also the values of avatar identification 34 and the values of the balloon identification 32 to the text field 26 of the data structure 20, in addition to the values of the images 33 to be displayed together with the text 39 inside the balloon.

On the basis of the content of the fields of the structured data package 40 and using the image 33 to be inserted along with the text in the balloon, the avatar image 35 and/or the balloon image 37—which are already present in the local memory of the receiver device 6 or which were downloaded to it by appropriately querying the central unit 8—the first software module is configured to compose and properly show the message 60 with the corresponding graphic elements, such as the image 33 to be inserted in the balloon, the avatar image 35 and/or the balloon image 37 on the screen 62 of the display of the receiver device 6.

In particular, as shown in FIG. 9, in the screen of the receiver device 6, the image 33 is displayed together with the text 39 of the message 60 inside the particular balloon 37 chosen by the sender user. Furthermore, on the screen 62 of the display of the receiver device 6, the balloon 37 is positioned near and/or is graphically connected to the image of the avatar 35 used by the sender user in that conversation.

It is also understood that the system 2 described above can provide the management/customization/selection only of the images 33 to be inserted together with the text 39 of the message 60 or even only avatar images 35 or balloon images 37.

It is also understood that the message 60 managed by the messaging system 2 can be text only 39 or have only graphic and/or audio elements 31 (in the form of images which can be inserted themselves in the balloon, of an internally empty balloon, or avatar images free from balloon) or, preferably, an appropriate combination of text 39 and said graphic and/or audio elements 31.

The operation of the system messaging described hereto provides a sequence of steps which are listed below and described.

Preliminarily, in order to be able to use the messaging system, the user must download and install the first software module on a device 4 and/or 6. Subsequently, the user must run the first software module on said device, log in so as to activate the step of synchronizing of the device and thus locally download (preferably respectively into the first local memory 90 and into the second local memory 91) the univocal identification codes 30' associated with the univocal identification code of the user who logged in and the graphic and/or audio elements 31 univocally identified by said codes 30'.

Appropriately, the checking and authentication procedure described above and preferably shown in the flow chart of FIG. 12 are also activated when the user logs into the messaging system 2.

Preliminarily, by interacting with the input means of the graphic interface of the sender device, the user, in addition to defining the text 39 of the message 60, selects/chooses the avatar 35 (see FIG. 5) and/or the balloon 37 (see FIG. 8) to be used for that message and selects/browses the image/symbol 33 to be inserted in that message (see FIG. 7).

On the basis of that defined and inserted by the user, the first software module of the sender device 4 generates the data structure 20, appropriately assigning the corresponding values 38 to the fields 22, 24, 26, 32, 34 and 36 of the latter, and sends a request containing the data structure thus created to the second software module of the central unit 8.

Appropriately, the second software module processes the request sent by the sender device 4 and prepares a structured data package 20 in an appropriate format for the data exchange.

Furthermore, on the basis of the receiver identification code 24, the central unit 8 prepares and sends a corresponding alert 52 to the notifying platform 50, to which the receiver device 6 belongs.

Conveniently, in the case of multiple receivers, for each receiver identification code 24, the central unit 8 prepares and sends a corresponding alert 52 to notifying platform 50, to which the receiver device 6 belongs.

The contents of the alert 52 is then sent by the notifying platform 50 to the receiver device 6, which then uses the contents of such alert to directly query the central unit 8 and download the corresponding structured data package 40 prepared by the second software module and addressed for it.

In the absence of or in addition to the alert 52 sent by notifying platform 50, the first software module can periodically access the central unit 8 to query it on possible presence/availability of one or more structured data packages 40 (i.e. messages) for it and, in the affirmative case, download such structured data package from the central unit 8.

Then, once the receiver device 6 has downloaded the structured data package 40, the software module loaded and running in such device processes it and breaks it down in order to extract/decode the contents of the fields in this package 40. In particular, the values of the text message field 26 and the balloon identification 32 and/or avatar identification 34 fields are extracted from the message body field 48 of structured data package 40.

In more detail, the univocal codes 30 of graphic and/or audio elements 31 are identified by searching the precoded labels/characters/symbols 28 inside the text field 26 and, if they are not already present in the local memory of the receiver device 6, the first software module sends a request to the central unit 8 which, after querying the corresponding database 12, extracts the corresponding graphic and/or audio element 31 and sends it to the receiver device 6, which element is then stored in the local memory of the receiver device 6 so as to be readily available locally in the case of any further, subsequent uses.

Appropriately, if the univocal codes 30 of graphic and/or audio elements 31 are instead already present in the local memory of the receiver device 6, the first software module does not send any request to the central unit 8.

Correspondingly, the avatar identification 32 and/or the balloon identification 34 are extracted from the message body field 48 of the structured data package 40 and/or by searching appropriate precoded labels/characters/symbols 28 in the text field 26 of the data structure 20, and, if they were not already present in the local memory of the receiver device 6, the first software module sends a request to the central unit 8 which, after querying the corresponding database 12, extracts and sends the corresponding avatar 35 and/or balloon 37 images to the receiver device.

Finally, on the basis of the content of the fields of the structured data package 40 and using the image 33 to be inserted along with the text in the balloon, the avatar image 35 and/or the balloon image 37—which are already present in the local memory of the receiver device 6 or which were downloaded to it by appropriately querying the central unit 8—the first software module is configured to compose and properly display the message 60 with the corresponding graphic elements, such as the image 33 to be inserted in the balloon, the avatar image 35 and/or the balloon image 37 on the screen 62 of the display of the receiver device 6 (see FIG. 9).

Preferably, the messaging system 2 is of the instantaneous and asynchronous type and can be appropriately used between portable devices, such as smartphones and tablets, and between computers which access an appropriate portal/web site (see FIG. 10).

The invention was described in particular for graphic elements (images), however it is understood which the same configuration and operation also applies to audio or video elements.

Advantageously, according to the invention, in the central unit 8 also implements a computing platform, which interfaces and communicates with the devices of the users registered in the described messaging system 2, and which is configured to act as a market in which messaging system users can download one or more of the graphic and/or audio elements present in the messaging system locally to their device, as a result of a purchase (i.e. in exchange for a fee, preferably using virtual currency) and/or for free.

Furthermore, the computing platform is configured so that the users who register to the messaging system 2 as the "authors" (or "artists") can create and view pages, which substantially act by showcases, in the platform itself in which the graphic and/or audio elements they created are shown, preferably collected in collections. Advantageously, the pages displayed in the platform may have a predetermined expiry date, so as to define a marketing campaign.

Correspondingly, users of the messaging system 2 access using their devices the computer platform so as to display the pages-showcases of the various "author" users. Once the user selects one or more graphic and/or audio elements, the user, in exchange for a fee and/or free of charge, is enabled to use and manage of these graphic and/or audio elements. In particular, for this purpose, as mentioned, a relationship 18 is created on database level 12 which associates the chosen and purchased graphic and/or audio elements of the dataset 16 with the buyer users, identified in the dataset 14. Conveniently, the users download them locally to the device on which they are acting and/or also to other devices associated with them.

Advantageously, said platform comprises a section, e.g. a blog, where "author" users and users of the messaging system can mutually interact. Appropriately, said platform comprises a section where the users of the messaging system can commission one or more "author" users to create a desired graphic and/or audio element.

Appropriately, these graphic elements, which can be downloaded and obtained from the platform, may include images to be inserted inside the balloon (in a manner corresponding to emojis) and/or the balloons themselves and/or images to be used as avatar. Advantageously, the graphic elements also comprise a graphic representation (e.g. a rosette, a scarf, cap, etc.) to add as accessory to the avatar image or the image which can be inserted inside the balloon.

Appropriately, the computer platform is configured so as to send a first part of the fee, which was paid by the user to purchase the graphic and/or audio elements from the platform, preferably to purchase the graphic representations to be added as accessory of the avatar image, to the author or to the subject who has made available said graphic elements in the platform, while another part of said fee is sent to the manager subject of the entire computer platform. Appropriately, the computing platform is configured to collect/gather the parts—which are intended for the manager subject of the platform itself—of the fees paid by users to purchase particular graphic and/or audio elements, in order to send them then to a single organization, preferably to an organization with charity, social and/or humanitarian purposes.

The messaging system and the method according to the invention is very advantageous because:

they allow users to successfully transmit customized graphic and/or audio elements in a messaging system, they make it possible to transmit and successfully display graphic and/or audio elements which may not have been present on the receiver's device when the message was sent, by using a single central unit in which all the graphic and/or audio elements are univocally identified, as well as the implementation of a first software module which, when the graphic and/or audio elements are not locally present on the device, they readily download the corresponding graphic and/or audio elements from the central unit 8, ensuring that these elements are always implemented/displayed correctly and completely in the message and ensuring that they are implemented in the same manner between sender and receiver, the downloading of the graphic and/or audio element locally to a given device occurs only the first time since, once downloaded, the element itself is stored in the local memory of the device; in particular, the fact which such downloading does not occur constantly or continuously, makes it possible to speed up the uploading of the data in the message, to save/optimize traffic data for the devices and to decrease the number of calls to the central unit, thereby reducing both computational processing and occupied bandwidth they allow users—in particular by virtue of the structure of the database—to have available only the graphic and/or audio elements associated with them (and therefore for which they have been authorized/enabled, e.g. as author and/or buyer) when preparing messages to be sent and concurrently makes it possible to show any graphic and/or audio element provided in received messages always correctly, completely and univocally, the database structure causes the user to download locally to each device all graphic and/or audio elements only at the moment of the registration of this device to the messaging system or to download/set-up/first use of such module in such device, thus making the synchronization of each device associated with that predetermined user particularly quick and simple, they allow the user to create graphic and/or audio elements to share and make available to other users, they allow the user to use a different avatar image and/or balloon for each message, they allow the user to enter images (in a manner corresponding to emojis) which are customized or customizable inside balloons, which are also customized or customizable, with and without the presence of text inside the balloon itself, the graphic and/or audio elements, as well as the avatar images and/or the balloons, are not shipped together with the message or attached to it; in particular, the use of univocal identification codes which are entered as text inside the structured data package make it possible to reduce the amount of data traffic and the network bandwidth to be occupied for message exchange.

Substantially—unlike WO2017/059524, WO2014/100682, US2015/0327033, U.S. Pat. No. 9,699,299 e WO2015/122993—in the present invention there is:

a database 12 in which the user dataset 14, which contains the data of each user of the messaging system 2 is in relationship 18 with at least one element dataset 16, which contains at least the univocal identification codes 30 of all graphic and/or audio and/or video elements which can be managed by the messaging system 2, so as thus to define the graphic and/or audio elements which can be accessed/managed by each user of the dataset user 14, and also the first software module is configured so that when it is run on a sender device 4 by a given user of the user dataset 14, only graphic elements 31 having the respective identification codes 30 associated with said user can be inserted in said message to be sent 60, when it is run in said receiver device 6, the graphic and/or audio element provided in the received message is always displayed correctly and univocally and, in particular, is configured so that—if such graphic and/or audio element is not already present in the receiver device 6—it is downloaded to the local memory of the receiver device 6 only for the purposes of displaying the received message.

Substantially, unlike WO2017/059524, WO2014/100682, US2015/0327033, U.S. Pat. No. 9,699,299 e WO2015/122993, in the present invention a hardware and software architecture is advantageously provided which makes it possible to dissociate the step of displaying of the graphic and/or audio elements—which in any case is configured so as to ensure always and in all cases the correct and complete showing of such elements in a received message—during the step of preparing/sending a message, in which instead only the graphic and/or audio elements associated with each user sender can be used/inserted in a message to be sent, i.e. only the graphic and/or audio elements for which each user has been previously authorized/enabled in the messaging system.

The central unit 8 may be implemented according to various types of digital computers, such as laptops, desktops, workstations, computers (PDA), servers, blade servers, mainframe computers and other appropriate computers.

The devices 4 and 6 may be implemented by means of desktop computers, portable computers, personal digital assistants (PDAs), smartphones, tablets, laptops, netbooks, ultra-mobile personal computers (UMPC), carputers and other similar devices.

The components, their connections and relationships, as well as their functions are described hereinafter by way of non-limiting example only.

The central unit 8 comprises a processor, a memory, a storage device, a high-speed interface connected to the memory and to the high-speed expansion ports and a low-speed interface connected to the bus at low speed and to the storage device. Each of the aforesaid components is interconnected using various buses and can be mounted on a common motherboard or in other appropriate manner. The processor can process instructions in order to run them in the central unit 8 comprising the instructions stored in the memory or on storage device, or in order to display graphic information adapted for a graphic user interface (GUI) on an external input/output device, e.g. a display coupled to the high-speed interface. In other implementations, several processors and/or multiple buses can be used, according to the different memories and memory types. They can also be connected to multiple computers, wherein each computer provides part of the necessary operations (e.g. a server bank, a server blade unit or a multiprocessor system).

The memory stores the information inside the central unit 8. In one implementation, the memory comprises one or more volatile or non-volatile storage units. The memory may comprise another form of storage device, such as a magnetic or optical disk.

The storage device can provide a mass memory for the central unit 8. In an implementation, the storage device may be or contain computer-readable means, e.g. a diskette device, a hard disk device, an optical disk device, a tape device, a flash memory or another similar solid-state memory device or a series of devices, including devices in a Storage Area Network (SAN) or in other configurations.

The second software module may be tangibly incorporated in a storage device. The storage device may be a non-computerized or computer-readable medium, such as the memory, the storage device or the processor memory.

The high-speed interface manages to the central unit 8 operations at high band intensity, while the low-speed interface manages operations at a low intensity of the band. This allocation of functions is by way of example only. In one implementation, the high-speed interface is coupled to the memory, to the display (e.g. through a graphic processor or accelerator) and to the high-speed expansion ports which can accept various expansion cards (not shown). In the implementation, the low-speed regulator is coupled to the storage device and to the low-speed expansion port. The low-speed expansion port, which may comprise various communication ports (e.g. USB, Bluetooth, Ethernet, wireless) may be coupled to one or more input/output devices, e.g. a keyboard, a pointer device, a scanner or a network device, such as a switch or router, e.g. via a network adapter.

The central unit 8 may be implemented in a plurality of different forms. For example, it may be implemented as a standard server or in groups of such servers. It can also be implemented as part of a rack server system or in a personal computer, possibly portable. Alternatively, the components of the central unit 8 may be combined with other components in a mobile device. Each of such components may contain one or more computers and, therefore, the central unit 8 may consist of multiple computers which communicate with one another.

The sender device 4 or the receiver device 6 comprises a processor, memory, input/output means such as a display, a communication interface and a transceiver. The device 4 or 6 can also be provided with a storage medium, such as a microdrive or another medium, to provide additional storage space. Each of these components is interconnected using various buses and can be mounted on a common motherboard or in other manners, as appropriate. The processor can run instructions inside the device 4 or 6, including instructions stored in the memory. The processor may be implemented as a set of integrated circuits (chipset) which comprise separate and multiple analog and digital processors. The processor may include, for example, the coordination of other components of the device, such as the control of user interfaces, the applications managed by the device and the wireless communication from the device. The processor may communicate with a user via the control interface and the display interface coupled to a display. The display can be, for example, a TFT display (Thin-Film-Transistor Liquid Crystal Display) or a display OLED (Organic Light Emitting Diode) or another appropriate display technology. The display interface may comprise appropriate circuits for controlling the display to present graphic information and other information to a user. The control interface may receive controls from a user and convert them to be subjected to the processor. Furthermore, an external interface may be provided in communication with the processor, so as to allow near communication of the device with other devices. The external interface may provide, for example, wired communication in some implementations or wireless communication in other implementations and multiple interfaces may also be used. The memory stores the information inside the device 4 or 6. The memory can be implemented as one means or more computer-readable media, a storage unit or multiple volatile units or one unit or more non-volatile storage units. The expansion memory may also be provided and connected to the device through the expansion interface, which may include, for example, a SIMM card (Single In-line Memory Module) interface. Such memory expansion can provide additional space to store the device 4 or 6 or may also store applications or other information for the device itself. In particular, the memory expansion may include instructions to perform or complete processes described above and may also include secure information. So, for example, the expansion memory may be provided as a form of security for the device and may be programmed with the instructions which allow the safe use of the device itself. Furthermore, via SIMM cards, security applications and additional information may be provided, such as the insertion of SIMM card identifying information in manner to prevent hacking. The memory may include, for example, the flash memory and/or NVRAM, as discussed below.

In one implementation, the first software module is tangibly incorporated in a storage device, which includes computer- or machine-readable means, such as the internal memory, the expansion memory, the processor memory or a propagated signal which may be received, for example, by the transceiver or by the external interface.

The devices 4 and 6 can communicate wirelessly via the communication interface, which may include the digital signal processing circuits, if necessary. The communication interface can provide, among other, communications in various modes or protocols, such as voice calls GSM, SMS, EMS or MMS, CDMA, TDMA, PDC, WCDMA, CDMA2000 or GPRS. Such communication can occur, for example, by means of the radio-frequency transceiver. Furthermore, a short-range communication may occur, e.g. with the use of a Bluetooth, Wi-Fi or other similar transceivers (not shown). The module GPS (Global Positioning System) receiver may provide additional wireless data relating to navigation or the location of the device which can be used conveniently by applications which run or can run on the device itself.

The device 4 or 6 can also communicate from the audio point of view using codec audio which can receive verbal information from a user and convert it into usable digital information. The codec audio may also generate an audible sound to a user, e.g. through a speaker, e.g. in a receiver of the client. Such sound may include a sound from voice calls, may include recorded sounds (e.g. voice messages, music files, etc.) and may also include the sounds generated by applications which operate on the device.

The client device 4 or 6 can be implemented in a plurality of different shapes and, for example, can be implemented with a mobile phone, a smartphone, PDA or other similar portable device.

The system and method described hereto may be implemented using different digital electronic circuits, integrated circuits, ASIC (i.e. Application Specific Integrated Circuit) hardware, firmware, software and/or combinations thereof. These different implementations may include the implementation in one or more computer programs, which can run and/or interpreted on a programmable system, which comprises at least one programmable processor, which can be dedicated or general, connected to receive data and instructions and to transmit data and instructions on a storage system, and provided with at least one input device and at least one output device.

These computer programs (also named software, software applications or code) include machine instructions for a programmable processor and may be implemented in a high-level procedural and/or object-oriented programming language and/or in assembly language or machine language.

The expressions "machine-readable means" and "computer-readable means" herein mean any product, apparatus and/or medium for computers (e.g. magnetic disks, optical disks, memory, programmable logic devices) used to provide machine instructions and/or data to a programmable processor, including a means which is readable by a machine and which receives machine instructions in form of a signal readable by the machine itself. The word "machine-readable signal" refers to any signal used to provide instructions and/or machine data to a programmable processor.

In order to interact with the user, the devices 4 or 6 described hereto may be provided with a display (e.g. a cathode ray tube) or an LCD (liquid crystal display) for displaying information to the user and a keyboard and pointer (e.g. a mouse or trackball) with which the user can provide information to the device itself. Other types of means can be used to interact with the user; For example, the feedback to the user can be in any form of sensory feedback (e.g. graphic feedback, auditory feedback or tactile feedback) and user input can be received in any form including acoustic, vocal or tactile input.

The system may also comprise any computerized system which comprises a back-end component (e.g. a data server) or a middleware component (e.g. an application server) or a front-end component (e.g. a client computer, equipped with a graphic user interface or a Web browser through which a user can interact) or any combination of such back-end, middleware or front-end components.

The system components can be interconnected with any digital data communication form or means (e.g. a communication network). Examples of communication networks include Local Area Network ("LAN"), Wide Area Network ("WAN") and the Internet.

The system according to the invention may comprise at least two clients, which respectively act as sender device 4 and receiver device 6, and at least one server acting as central unit 8. The client and server are generally mutually distant and generally interact via a communication network and, preferably, interact always and only through the Internet. The relationship between client and server is implemented by means appropriate computer programs running on the respective processors and which have mutual client-server relationships.

The invention claimed is:

1. An messaging system (2), comprising:
a sender device (4) and a receiver device (6) configured to send and/or receive text messages (60) via a central unit (8) with which both sender and receiver devices communicate, wherein:
the central unit (8) comprises a database (12), in which a user dataset (14) that contains a univocal identification code (ID) for each user of the messaging system (2) is in relationship (18) with an element dataset (16) that contains the univocal identification codes (30) of all graphic and/or audio elements manageable by the messaging system (2), to thereby define graphic and/or audio elements accessible and manageable by each user of the user dataset (14),
wherein each graphic and/or audio element manageable in the messaging system (2) is associated with the univocal identification code (30) in the messaging system (2);
a first software module is loaded and run in the sender device (4) and the receiver device (6),
wherein the first software is configured to send a data structure (20) to the central unit (8) generated based on a message to be sent (60) which has a graphic and/or audio element (31, 33, 35, 37), the data structure (20) comprising a first field (26), which contains a corresponding univocal identification code (23, 30, 32, 34) of the graphic and/or audio element of the message (60); and
a second software module is loaded and run in the central unit (8), the second software module, based on the rata structure (20) that has been received, creates a structured data package (40) comprising a second field (48) which is filled in at least in part with the first field (26) of the data structure (20),
wherein the first software module is configured so that, when the first software module is run in the sender device (4) by a given user of the user dataset (14) only graphic elements (31) which have the respective identification codes (30) in relationship (18) with the univocal identification code ID of the user in the database (12) can be inserted in the message to be sent (60),
wherein the first software module, loaded and run in the receiver device (6), is also configured to perform the following operations:
obtaining the structured data package (40) from the central unit (8), and detecting, inside the second field (48) of the structured data package (40), the univocal identification code (23, 30, 32, 34) of the graphic and/or audio element (31, 33, 35, 37),
if the graphic and/or audio element associated with the univocal code (23, 30, 32, 34) identified in the second field (48) of the structured data package (40) is not already present in a local memory where the first software module is running, requesting the graphic and/or audio element (31, 33, 35, 37) associated with the identified univocal code (23, 30, 32, 34) from the central unit (8) and downloading the graphic and/or audio element locally,
based on contents of the structured data package (40) and of the graphic and/or audio element associated with the univocal code thus identified (23, 30, 32, 34), showing the sent message (60) and implementing the graphic and/or audio element (31, 33, 35, 37) on a display of the received device (6) where the first software module is running, and wherein the first software module, loaded and run in the sender device (4), is configured to send an enabling/authorization request to the central unit (8) to use a specific graphic and/or audio element (31), and after accepting the enabling/authorization request, the second software module is configured to define the relationship (18) between the univocal identification code of the user who sent the enabling/authorization request to the central unit (8) and the univocal identification code (30) of the graphic and/or audio element (31) for which the enabling/authorization request was made.

2. The messaging system according to claim 1, wherein the element dataset (16) also contains data of an address/location of an additional database (47), in which the data which define the corresponding graphic and/or audio elements (31) are stored.

3. The messaging system according to claim 1, wherein the database (12) is configured and structured so that the user dataset (14) and the element dataset (16) are mutually associated by way of a relationship (18) which provides another dataset and which contains a list of the elements of the dataset (16) which are available/usable/manageable by each user of the dataset (14), and wherein the relationship (18) associates the univocal identification code (30) of each graphic and/or audio element (31), as provided in the element dataset (16), with the univocal identification code (ID) of each user, as provided in the user dataset (14).

4. The messaging system according to claim 1, wherein the database (12) is configured and structured so that the user dataset (14) and the element dataset (16) are mutually associated by way of two types of relationships (18), which include:
a first type of relationship, which associates the elements of the dataset (16) which were created by the user and/or which were uploaded by the user in the messaging system (2) with each user, and
a second type of relationship, which contains the elements of the dataset (16) for which the user was authorized/enabled for each user.

5. The messaging system according to claim 1, wherein the first software module is further configured to upload one of the graphic and/or audio elements generated by the user to the database (12) of the central unit (8) so as to make the one of the graphic and/or audio elements available also for other users of the messaging system (2).

6. The messaging system according to claim 1, wherein:
the first software module is further configured to send a specific graphic and/or audio element which is not yet present in the database (12) to the central unit (8) so as to register the specific graphic and/or audio element in the messaging system (2), and
the second software module loaded and run in the central unit (8) is configured to store the specific graphic and/or audio element in the database (12) thus received by assigning a corresponding univocal identification code (30) to the specific graphic and/or audio element.

7. The messaging system according to claim 1, wherein the messaging system is configured so that:
the first software module sends a specific graphic and/or audio element (31) to the central unit (8), and
the central unit stores the specific graphic and/or audio element (31) in the database (12) associating a univocal identification code (30) with specific graphic and/or audio element (31), and the second software module defines a new relationship (18) between the univocal identification code of the user who sent the specific graphic and/or audio element to the central unit (8) and the univocal identification code (30) of the graphic and/or audio element (31) thus sent.

8. The messaging system according to claim 1, wherein the first software module is further configured so that a data entry keyboard is shown on a display of the sender device (4) of a given user containing only the graphic and/or audio elements (31) which have respective identification codes (30) in the relationship (18) with the univocal identification code ID of the user in the database (12).

9. The messaging system according to claim 1, wherein the first software module loaded in the sender device (4) and the second software module loaded into the central unit (8) are also configured to implement an authentication check and procedure of a sender user who is using the messaging system (2).

10. The messaging system according to claim 1, wherein the first and the second software module are configured to perform the following operations:
the first software module of the sender device (4) sends login data that users enter, by acting on the users' sender devices (4), when the users log into the messaging system (2) to the second software module of the central unit (8),
the second software module of the central unit (8) checks the received login data, extracts the univocal identification code (ID) of a corresponding user from the user dataset (14) and generates a corresponding computer object containing the univocal identification code (ID) of the corresponding user,
the second software module of the central unit (8) encrypts a computer object (X) thus created with a private key, thus generating an encrypted computer object (Y),
the second software module of the central unit (8) sends the encrypted computer object (Y) to the first software module of the sender device (4), which stores the encrypted computer object (Y) locally, and
wherein, when the user sends a text message (60) with the sender device (4), the first software module and the second software module are configured to perform the following actions:
the first software module sends both the data structure (20) and the previously received and locally stored encrypted computer object (Y) to the central unit (8),
the second software module of the central unit (8), before processing the data structure (20), decrypts the encrypted computer object (Y) and so extracts the computer object (X) containing the user ID, and
the second software module of the central unit (8) processes the data structure (20) also availing of the user's identification code ID.

11. The messaging system according to claim 1, wherein the second software module loaded and running in the central unit (8) is configured to:
extract the univocal identification code (30) of a specific graphic and/or audio element (31) contained in the data structure (20) from the data structure (20), which was sent to the unit (8) by the sender device (4),
check whether the univocal identification code of the user (ID) who has sent the data structure (20) is associated with the previously extracted univocal identification code (30) of the graphic and/or audio element (31) in the database (12), if the check result is positive, continue by generating the structured data package (40) based on the received structure data (20), and if the check result is negative, interrupt/block a processing of the data structure (20) sent by the sender device (4).

12. The messaging system according to claim 1, wherein the sender device (4) and/or the receiver device (6) comprises:

a first local memory (90), in which to download and store the identification codes (30') of all graphic and/or audio elements (31') which are associated with the univocal identification code (ID) of a given user who has logged into the messaging system (2) using the sender device (4) and/or the receiver device (6) in the database (12) of the central unit (8), and a second local memory (91), in which to download and store all the graphic and/or audio elements (31') corresponding to the univocal identification codes (30') downloaded and stored in the first memory (90).

13. The messaging system according to claim 12, wherein:

the first local memory (90) comprises a mass memory or primary memory or RAM memory, and the second local memory (91) comprises a mass memory or primary memory or RAM memory or is of type cache.

14. The messaging system according to claim 12, wherein the first software module loaded and running in the sender device (4) and/or the receiver device (6) and the second software module loaded onto the central unit (8) are further configured so that:

login data entered by the user, by interacting with the user's sender device (4), when logging into the messaging system (2), is sent to the second software module of the central unit (8), in the central unit (8), the received login data are verified, the univocal identification code (ID) is extracted from the user dataset (14) and the univocal identification codes (30) of all graphic and/or audio elements (31) which are associated with the univocal identification code (ID) of the user are identified using the code thus extracted, the univocal identification codes (30) of all graphic and/or audio elements (31) thus identified are downloaded to the first local memory (90) of the sender device (4) and/or the receiver device (6), and the graphic and/or audio elements (31) thus identified are downloaded to the second local memory (91) of the sender device (4) and/or the receiver device (6).

15. The messaging system according to claim 12, wherein the first software module of the sender device (4) and/or the receiver device (6) is configured to show a data entry keyboard on a display of the device, so as to create a message to be sent, which has access to, and shows on the display, only the graphic and/or audio elements (31) the univocal identification codes (30) which are stored in the first memory of the sender device (4) and/or the receiver device (6).

16. The messaging system according to claim 12, wherein the first software module of the sender device (4) is also configured to perform the following operations:

retrieving a list of the univocal identification codes (30') present in the first local memory (90) of the sender device (4), using the univocal identification codes (30'), retrieving corresponding graphic and/or audio elements (31') univocally identified by the univocal identification codes (30') from the second local memory (91) of the sender device (4), and showing only the graphic and/or audio elements (31') thus retrieved on a data entry device of the sender device (4).

17. The messaging system according to claim 12, wherein the first software module loaded and running in the receiver device (6) is configured to:

verify whether the univocal code (23, 30, 32, 34), which was identified in the second field (48) of the downloaded structured data package (40), is not already present in the first local memory (90) of the device in which the first software module is running, and if the result of the check is negative, request the graphic and/or audio element (31, 33, 35, 37) associated with the identified univocal code (23, 30, 32, 34) from the central unit (8) and download the graphic and/or audio element (31, 33, 35, 37) to the second local memory (91).

18. The messaging system according to claim 12, wherein there are stored/kept in the second local memory (91) of the sender device (4) and/or the receiver device (6):

a first set of graphic and/or audio elements (31'), the univocal codes (30') corresponding thereto which are stored/present in the first local memory (90); and a second set of graphic and/or audio elements (31'), the univocal codes (30') corresponding thereto which are not stored/present in the first local memory (90).

19. The messaging system according to claim 18, wherein the first software module of the sender device (4) is also configured so as to show a data entry keyboard on the display on a display, so as to create a message to be sent, which has access to, and shows on the display, only the first set of graphic and/or audio elements (31') present in the second local memory (91) of the device.

20. The messaging system according to claim 12, wherein the graphic and/or audio element is a graphic element which is:

an image (33) to be shown, optionally with a text (39) of a message (60), in a balloon of the message, an image to be used as avatar of the user (35) for a given message (60) and/or in the messaging system, and/or a balloon (37), in which the text (39) of message (60) and/or a specific graphic and/or audio element (33) is shown, and wherein the second field (48) of the structured data package (40) further contains the univocal identification code (30) which was entered into a dedicated field (32, 34).

* * * * *